United States Patent
Aalto

[19]
[11] Patent Number: 5,862,489
[45] Date of Patent: Jan. 19, 1999

[54] POWER CONTROL METHOD AND ARRANGEMENT FOR HANDOVER IN A MOBILE COMMUNICATION SYSTEM

[75] Inventor: Risto Aalto, Riihimäki, Finland

[73] Assignee: Nokia Telecommunications Oy, Espoo, Finland

[21] Appl. No.: 765,265

[22] PCT Filed: Jun. 12, 1995

[86] PCT No.: PCT/FI95/00340

§ 371 Date: Dec. 12, 1996

§ 102(e) Date: Dec. 12, 1996

[87] PCT Pub. No.: WO95/35003

PCT Pub. Date: Dec. 21, 1995

[30] Foreign Application Priority Data

Jun. 13, 1994 [FI] Finland ..................... 942805

[51] Int. Cl.⁶ .................................. H04B 1/06
[52] U.S. Cl. .................. 455/522; 455/436; 310/331
[58] Field of Search ............. 455/69, 436, 437, 455/438, 439, 442, 522; 370/331, 332, 335

[56] References Cited

U.S. PATENT DOCUMENTS

| | | | |
|---|---|---|---|
| 4,696,027 | 9/1987 | Bonta | 455/436 |
| 4,797,947 | 1/1989 | Labedz | 455/69 |
| 5,042,082 | 8/1991 | Dahlia | 455/437 |
| 5,212,823 | 5/1993 | Fujii et al. | 455/522 |
| 5,241,690 | 8/1993 | Larsson et al. | 455/522 |
| 5,487,174 | 1/1996 | Persson | 455/522 |
| 5,487,180 | 1/1996 | Ohtake | 455/522 |
| 5,491,837 | 2/1996 | Haarsten | 455/522 |
| 5,499,387 | 3/1996 | Chambert | 455/437 |
| 5,507,018 | 4/1996 | Seppali | 455/522 |
| 5,524,009 | 6/1996 | Tuutijarvi et al. | 455/436 |
| 5,574,983 | 11/1996 | Douzono et al. | 455/522 |
| 5,634,195 | 5/1997 | Sawyer | 455/522 |
| 5,666,654 | 9/1997 | Kanai | 455/522 |

FOREIGN PATENT DOCUMENTS

| | | |
|---|---|---|
| 43 04 095 | 8/1994 | Germany. |
| 2 271 245 | 4/1994 | United Kingdom. |
| 9319537 | 9/1993 | WIPO. |
| 95/02950 | 1/1995 | WIPO. |

*Primary Examiner*—Thanh Cong Le
*Assistant Examiner*—Makoto Aoki
*Attorney, Agent, or Firm*—Pillsbury Madison & Sutro LLP

[57] ABSTRACT

For providing power control for a mobile station in a mobile communication, in connection with accomplishing a handover of the mobile station from a presently serving cell to a target cell, each cell is assigned a maximum transmitting power level at which mobile stations are allowed to transmit in the cell. The receive level of the downlink signal of the handover target cell is measured at the mobile station prior to the handover, and the transmitting power level of the measured receive level of the downlink signal of the target cell. The mobile station is commanded to use the determined transmitting power level as its initial output power level in the target cell following the handover. The transmitting power level of the mobile station following the handover is lower than the maximum transmitting power level of the target cell by an amount equal to the difference between the optimum level of the uplink signal of the target cell and the measured receive level of the downlink signal of the target cell as measured prior to the handover, if the measured receive level of the target cell is higher than the optimum level of the uplink signal of the target cell.

7 Claims, 3 Drawing Sheets

POWER CONTROL METHOD AND ARRANGEMENT FOR HANDOVER IN A MOBILE COMMUNICATION SYSTEM

This application is the national phase of international application PCT/FI95/00340, filed Jun. 12, 1995 which designated the U.S.

FIELD OF THE INVENTION

The present invention relates to a power control method and arrangement for a handover in a mobile communication system.

BACKGROUND OF THE INVENTION

It is characteristic of a modern mobile communication system that a mobile station is free to roam and connect from one cell to another within the mobile communication system. If a mobile station does not have an ongoing call, the cell crossover only results in registering to a new cell. If a mobile station MS is handling a call during the cell crossover, the call must also be switched to the new cell by a way which causes as little disturbance to the call as possible. The cell crossover process during an ongoing call is called a handover. A handover may also be carried out within the cell from one traffic channel to another. In order for the mobile communication system to be able to detect a need for a handover and to select a suitable target cell for the handover, various kinds of measurements are required in order to determine the connection quality and field strength levels of the neighbouring cells. A handover from the serving cell to a neighbouring cell can occur, for example, (1), as measurement results of the mobile station/base station indicate a low signal level and/or quality in the present serving cell, and a better signal level can be obtained in a neighbouring cell, or (2), as a neighbouring cell enables communication at lower transmitting power levels. The latter may occur in cases a mobile station is in a border area between cells. In radio networks, the aim is to avoid unnecessarily high power levels and thus interference elsewhere in the network.

The transmitting power of a mobile station is usually controlled from the fixed network by a power control algorithm. The mobile station measures the receive level (field strength) and quality of the downlink signal received from the base station of the serving cell, and the base station of the serving cell, in turn, measures the receive level (field strength) and quality of the uplink signal received from the mobile station. On the basis of these measurement results and the preset power control parameters, the power control algorithm determines an appropriate transmitting power level of which the mobile station is then informed in a power control command. During a call, power control is continuous.

Mobile communication systems of this kind, however, have a problem regarding the post-handover situation. Following the handover, it takes a while before an adequate number of measurement results can be obtained from the mobile station and the base station of the new cell, and before the power control algorithm is able to make an optimal adjustment to the transmitting power levels of the base station and the mobile station. For this reason, the mobile station is first, following the handover, commanded to use the highest transmitting power allowed to it in the new cell. The highest allowed transmitting power ensures an adequate link quality even to those mobile stations that are located in the cell border area as the handover is carried out. If, however, the mobile station is closer by as the handover is carried out, the highest allowed transmitting power might be unnecessarily high. Although the power control rapidly decreases the transmitting power of the mobile station to an appropriate level, the post-handover radio frequency power peaks may cause uplink disturbances in the radio network. Furthermore, overrated power levels unnecessarily shorten the battery life in the battery-powered mobile station.

SUMMARY OF THE INVENTION

The object of the present invention is a power control method for alleviating the aforementioned problem.

This is obtained by a power control method which according to the invention is characterized by assigning each cell a maximum transmitting power level at which mobile stations are allowed to transmit in the cell, measuring the receive level of the downlink signal of the handover target cell at the mobile station prior to the handover, determining the transmitting power level of the mobile station for each target cell by utilizing the measured receive level of the downlink signal of the target cell, commanding the mobile station to use the determined transmitting power level as the initial output power level in the target cell following the handover.

The invention further relates to a power control arrangement for a handover in a mobile communication system. According to the invention, it is characteristic of the arrangement that each cell is assigned a maximum transmitting power level at which the mobile stations are allowed to transmit in the cell, and an optimum level for the uplink signal which the mobile station is to achieve following the handover, and that the transmitting power level of the mobile station following the handover is lower than the maximum transmitting power level of the target cell by an amount equal to the difference between the optimum level of the uplink signal of the target cell and the measured receive level of the downlink signal of the target cell as measured prior to the handover, if the measured receive level of the target cell is higher than the optimum level of the uplink signal of the target cell.

The basic idea of the present invention is to optimize the transmitting power level which the mobile station is to use in each target cell following the handover so that the transmitting power level of the mobile station is lower if measurements made prior to the handover show that uplink signal conditions in the target cell are good. Prior to the handover, however, the mobile station can only measure the downlink signal level of the target cell, the neighbouring cell at the time, and thus the fixed network does not have any kind of measured advance information on the uplink signal conditions in the target cell. The present invention, however, utilizes the fact that cellular networks are designed in such a way that there exists a power balance between the downlink and uplink directions. Thus, it can be assumed that the level of the cell downlink signal approximates the level of the uplink signal at the cell service area. So, a high uplink signal level denotes a high downlink signal level. As the mobile stations measure the broadcast control channel of the neighbouring cells on which the maximum transmitting power is used, it can be assumed that the high level of the downlink signal of the target cell which is measured prior to the handover means that the appropriate transmitting power level of the mobile station following the handover would be lower than the maximum transmitting power level which the mobile station is allowed to use in the target cell. Thus, the transmitting power level which the mobile station is to use following the handover can, according to the invention, be optimized by taking into account the level of the downlink signal of the target cell, which level is measured prior to the handover.

In the preferred embodiment of the present invention, the target cell is in addition assigned an optimum level for the uplink signal which the mobile station is to achieve immediately following the handover. Because the optimum level of the uplink signal is adequate as far as the connection is concerned, a measured downlink signal level higher than that means a power margin that can be utilized to reduce the transmitting power of the mobile station. According to the invention, following the handover a transmitting power level lower than the maximum transmitting power is used, which lower transmitting power is determined by subtracting the difference between the measured level of the downlink signal of the target cell and the optimum level of the uplink signal of the target cell from the highest transmitting power level of the target cell. The method considerably reduces the transmitting power level of the mobile station in cases the measured downlink level of the target cell is much higher than the optimum level of the uplink signal, in other words, in cases the mobile station is close to the base station of the target cell.

BRIEF DESCRIPTION OF THE DRAWINGS

In the following, the invention will be described in closer detail by illustrating embodiments with reference to the accompanying drawings in which.

DETAILED DESCRIPTION OF PREFERRED EMBODIMENTS OF THE INVENTION

The present invention can be applied to any cellular or trunked mobile communication system, such as the Pan-European mobile communication system GSM, DCS1800 (Digital Communication System), PCN (Personal Communication Network), UMC (Universal Mobile Communication), UMTS (Universal Mobile Telecommunication System), FPLMTS (Future Public Land Mobile Telecommunication System), etc.

Figure 1:
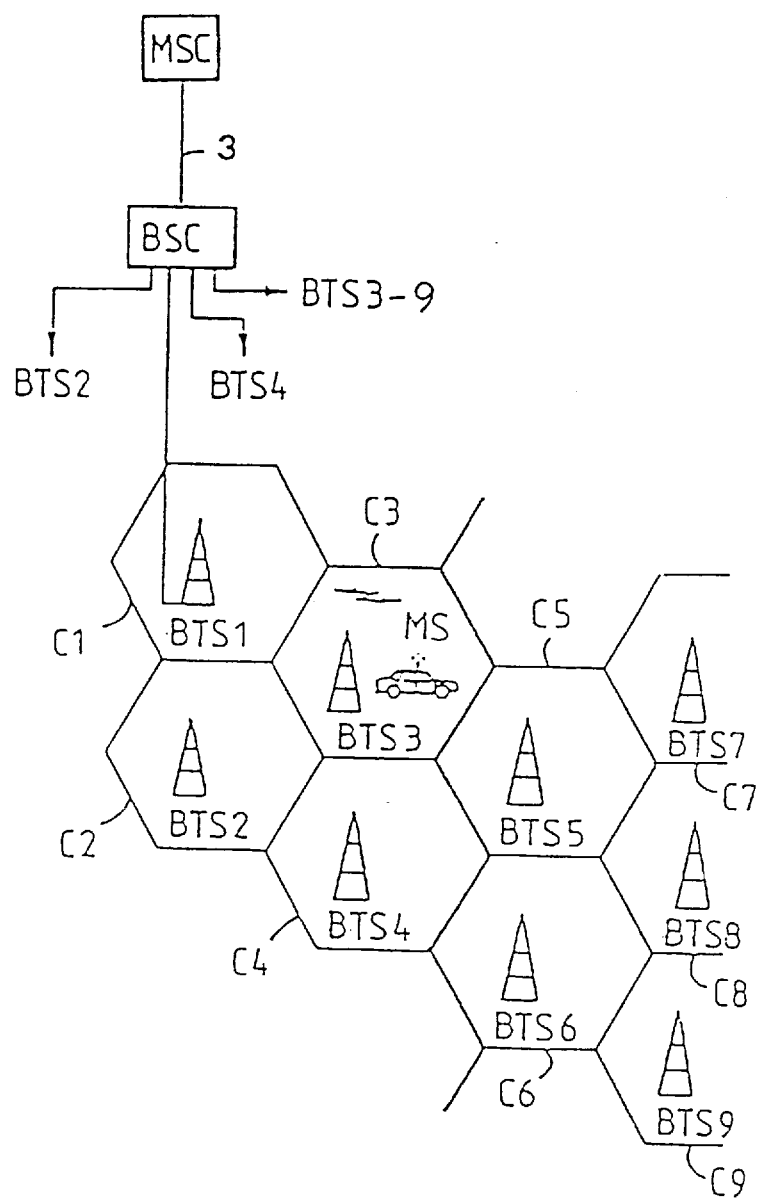
FIG. 1 illustrates a part of a mobile communication system to which the invention can be applied.

FIG. 1 illustrates, as an example, a mobile communication system of the GSM type. The GSM (Global System for Mobile Communications) is a Pan-European mobile communication system which is becoming the universal standard. FIG. 1 very briefly illustrates the basic elements of the GSM system without going any further into the system. For a closer description of the GSM system, the GSM recommendations and "The GSM System for Mobile Communications", M. Mouly & M. Pautet, Palaiseau, France, 1992, ISBN:2-9507190-0-7 are referred to.

The GSM system is a cellular radio system. A mobile services switching centre MSC handles the connecting of incoming and outgoing calls. It carries out functions similar to those of an exchange of a public switched telephone network (PSTN). In addition to these, it also carries out functions characteristic of mobile communications only, such as subscriber location management in co-operation with the subscriber registers of the network. As subscriber registers, the GSM system at least includes the home location register HLR and the visitor location register VLR which are not shown in FIG. 1. More accurate information of the location of the subscriber, usually the accuracy of the location area, is stored in the visitor location register, there being typically one VLR for each mobile services switching centre MSC, while the HLR knows which VLR area the mobile station MS is visiting. The mobile stations MS are connected to the centre MSC by base station systems. The base station system consists of a base station controller BSC and base stations BTS, i.e. fixed transceivers the mobile stations MS use to communicate with the fixed network over a radio link. One base station controller is used to control several base stations BTS. The tasks of the BSC include, among other things, handovers in cases in which the handover is carried out within the base station, or between two base stations controlled by the same BSC. FIG. 1 only shows, for reasons of clarity, a base station system in which nine base stations BTS1–BTS9 are connected to a base station controller BSC, the radio coverage area of which base stations forms the corresponding radio cells C1–C9.

Decisions on handovers during on-going calls are made by a base station controller BSC on the basis of various handover parameters assigned to each cell, and on the basis of measurement results reported by a mobile station MS and base stations BTS. A handover is normally carried out on the basis of criteria of the radio path, but it can be performed due to other reasons as well, for example, load sharing.

In accordance with the GSM technical recommendations, for example, a mobile station MS monitors (measures) the level and quality of the downlink signal of the serving cell, and the level of the downlink signal of the neighbouring cells of the serving cell. The base station BTS monitors (measures) the level and quality of the uplink signal received from each mobile station MS served by said base station BTS. All the measurement results are transmitted to the base station controller. Alternatively, all decisions on a handover can be made at a mobile services switching centre MSC to which all the measurement results are in such a case transmitted. A MSC also controls at least those handovers occurring from the area of one base station controller to the area of another.

If a mobile station MS roams in a radio network, a handover from the traffic channel of the serving cell to the traffic channel of the neighbouring cell is normally performed either (1) as the averaged measurement results of the mobile station MS and/or the base station BTS indicate a low signal level and/or quality from the current serving cell and a better signal level can be obtained from a neighbouring cell, and/or (2) as a neighbouring cell enables communication at lower transmitting power levels, in other words, as the mobile station MS is in a border area between cells. In radio networks, the aim is to avoid unnecessarily high power levels and thus interference elsewhere in the network.

The base station controller BSC selects according to the system handover algorithm and on the basis of the reported measurement results, one cell from among the neighbouring cells as the target cell for the handover. The selection may be simplest implemented by selecting a neighbouring cell which has the best radio path qualities, i.e. the highest signal level.

It should be noted that the exact implementation of a handover is not essential to the present invention. The power control of the invention can be introduced into practically all network controlled handover procedures. Thus, it is not necessary to describe a handover in any greater detail in this application.

The transmitting power of a mobile station is usually controlled from a fixed network by a special power control algorithm. The mobile station measures the receive level (field strength) and quality of the downlink signal received from the base station of the serving cell, and the base station of the serving cell, in turn, measures the receive level (field strength) and quality of the uplink signal received from the mobile station. On the basis of these measurement results and the preset power control parameters, the power control algorithm determines an appropriate transmitting power level of which the mobile station is then informed in a power control command. During a call, power control is continuous.

It should be noted that the exact implementation of a normal power control is not essential to the present invention, either. The power control of the invention can be introduced into practically all power control algorithms. Thus, it is not necessary to describe the normal power control in any greater detail herein.

Figure 2:
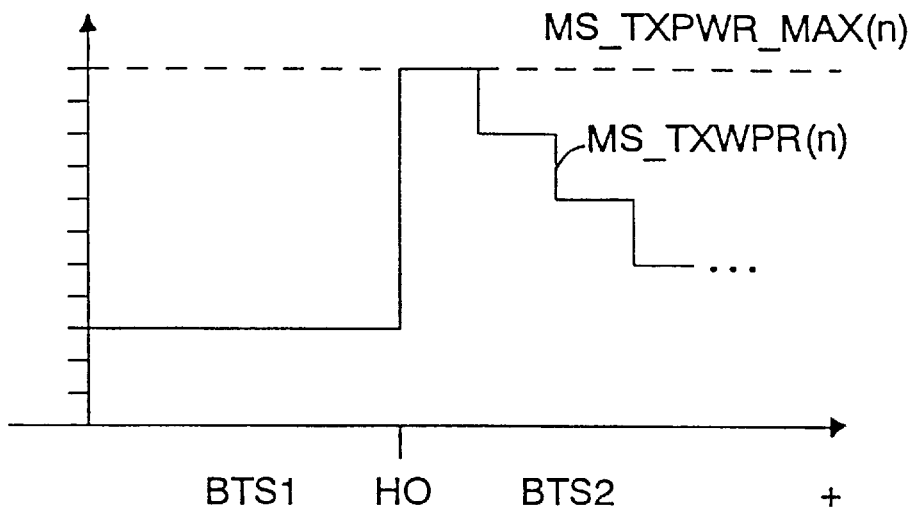
FIG. 2 is a chart illustrating the prior art transmitting power control.

The graph of FIG. 2 illustrates a prior art situation in which a mobile station carries out a handover HO from base station BTSI to base station BTS2 at the location HO, and in which a mobile station is commanded to use the maximum transmitting power $MS\_TXPWR\_MAX(n)$ of the base station BTS2 as its initial transmitting power $MS\_TXPWR(n)$. This results in a sudden RF power peak before the power control algorithm adjusts the mobile station MS transmitting power to an appropriate level.

According to the present invention, the initial transmitting power $MS\_TXPWR(n)$ of the mobile station in the target cell following the handover is, instead of the maximum transmitting power $MS\_TXPWR\_MAX(n)$ of the target cell, adjusted to a value which is determined by utilizing the measurement which the mobile station MS has carried out prior to the handover concerning the receive levels (field strengths) of the downlink signals of the neighbouring cells, which measurement also provides the receive level of the downlink signal of the target cell for the handover. As cellular networks are usually designed in such a way that there exists a power balance between the downlink and uplink directions, it can be assumed that the level of the downlink signal of the cell approximates the level of the uplink signal at the cell service area. So, a high downlink signal level indicates that the mobile station MS is relatively close to the base station of the cell, and, thus, also a high uplink signal level, if the maximum transmitting power is used. So, the transmitting power level $MS\_TXPWR(n)$ of the mobile station MS following the handover can, according to the invention, be optimized by taking into account the level of the downlink signal $RX\_LEV\_NCELL(n)$ of the target cell which level is measured prior to the handover.

In the preferred embodiment of the invention, the cells are assigned an optimum level MsOptLevel for the uplink signal, which level is adequate for the connection, and which the mobile station is to achieve immediately following the handover. The optimum level for the uplink signal is advantageously assigned to each cell separately. Because the optimum level of the uplink signal of the cell is adequate for the connection, any measured level for the downlink signal higher than the optimum level for the uplink signal indicates a power margin which can be utilized in order to reduce the transmitting power of the mobile station. According to the primary embodiment of the invention, the optimized initial transmitting power $MS\_TXPWR(n)$ for the mobile station is calculated in the following way:

$$MS\_TXPWR(n)=MS\_TXPWR\_MAX(n)-MAX(0,(RXLEV\_NCELL(n)-MsOptLevel))$$

in which $MS\_TXPWR\_MAX(n)$ represents the maximum transmitting power which the mobile station MS is allowed to use in the target cell (n). The maximum transmitting power can be, for example, within the range 13 dBm–43 dBm. $RXLEV\_NCELL(n)$ represents the downlink signal level of the target cell (n), which level the mobile station MS measures prior to the handover in measurements concerning the neighbouring cells. The level of the downlink signal typically lies in the range –110 dBm . . . –47 dBm. The function MAX ensures that only positive ($\geq 0$) differences between the measured level of the downlink signal and the optimum level of the uplink signal are taken into account.

Figure 3:
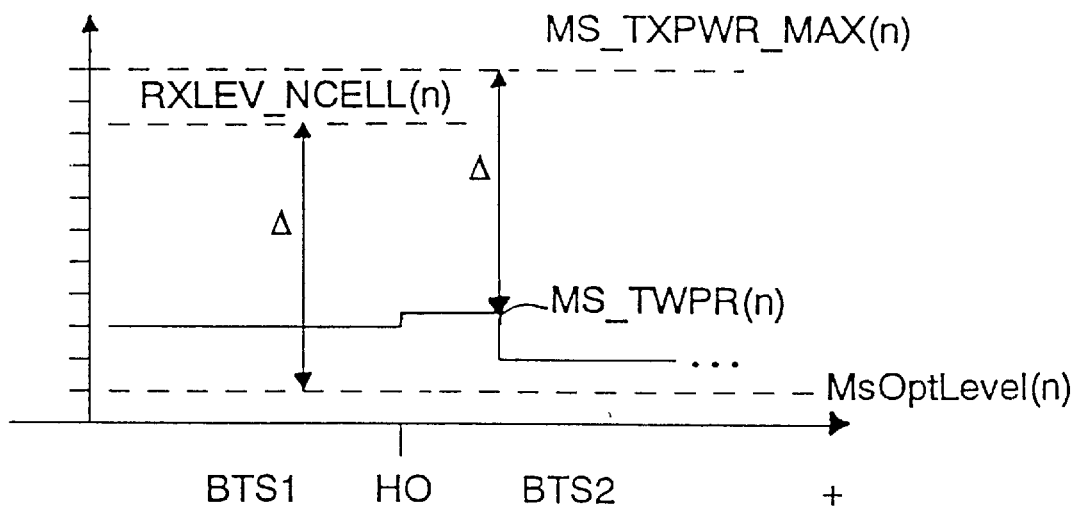
FIG. 3 is a chart and FIG. 4 a flow chart which illustrate the transmitting power control according to the invention.
Figure 4:
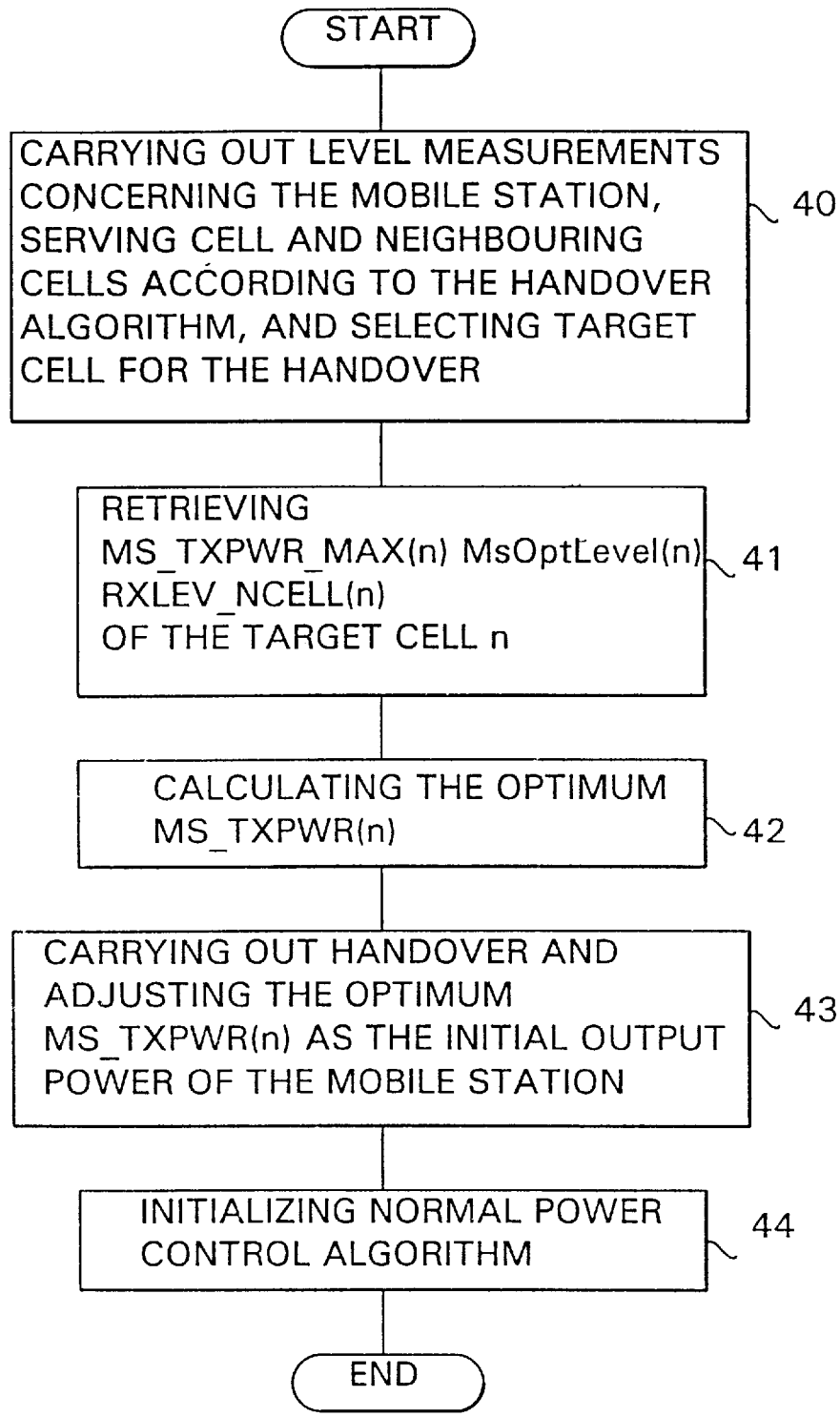

The graph of FIG. 3 illustrates a situation of the invention in which situation a mobile station MS carries out a handover HO from the base station BTS1 to the base station BTS2 at the location HO. The handover and the power controls are usually carried out by a base station controller BSC whose operation is illustrated by the flow chart of FIG. 4. As the mobile station MS is in the cell of the current base station BTS1, it carries out measurements in accordance with the handover algorithm employed by the system concerning the level, possibly quality as well, of the downlink signal of the serving cell, and the receive level of the downlink signals of the neighbouring cells. In addition, the base station BTS1 can measure the level and quality of the uplink signal of the mobile station MS. On the basis of these measurements, a decision on a handover is made according to the criteria of the handover algorithm, and the target cell for the handover is selected, in this case the cell of the base station BTS2 (block 40). Following this, the base station controller searches from its data base the maximum transmitting power $MS\_TXPWR\_MAX(n)$ of the target cell n, and the optimum level $MsOptLevel(n)$ of the uplink signal. In addition, on the basis of measurements the mobile station MS has carried out concerning the neighbouring cells, the base station controller BSC obtains the receive level $RXLEV\_NCELL(n)$ of the downlink signal of the target cell prior to the handover (block 41). Then, according to the equation above (block 42), the base station controller BSC determines an optimum initial power level $MS\_TXPWR(n)$ for the mobile station MS in the target cell. As can be seen in FIG. 3, the measured signal level $RXLEV\_NCELL(n)$ is higher than the optimum level $MsoptLevel(n)$ of the uplink signal, in which case the difference in signal levels $\Delta$ between the measured signal level and the optimum level of the uplink signal can be utilized in order to reduce the transmitting power of the mobile station MS. As the handover HO is carried out, the optimized initial output power $MS\_TXPWR(n)$ for the mobile station MS is adjusted (block 43) lower than the maximum transmitting power $MS\_TXPWR\_MAX(n)$ of the target cell to the extent of the said difference in signal levels $\Delta$, as can be seen in FIG. 3. Following this, the normal power control algorithm is initiated (block 44). As shown by FIG. 3, by the present invention unnecessary RF power peaks can be avoided in a handover.

The drawings and their description are only meant to illustrate the present invention. The method and arrangement of the invention may vary in details within the attached claims.

I claim:

1. A power control method for handover to a handover target cell in a mobile communication system including mobile stations and cells, comprising the steps of:

assigning each cell a maximum transmitting level at which mobile stations are allowed to transmit in the respective cell, measuring the receive level of the handover target cell at a respective mobile station prior to the handover, determining the transmitting power level of the mobile station for said target cell by utilizing the measured receive level of a downlink signal of the target cell, and commanding the mobile station to use said determined transmitting power level as an initial output power level in the target cell following the handover.

2. The method as claimed in claim 1, further comprising:

assigning each cell an optimum level for an uplink signal which the mobile station is to achieve following the hand, and setting the transmitting power level which the mobile station it is to use in the target cell following the handover to a value which is lower than the maximum transmitting power level of the target cell by an amount equal to the difference between the optimum level of the uplink signal of the target cell and the measured receive level of the downlink signal, if the measured receive level of the target cell is higher than the optimum level of the uplink signal of the target cell.

3. The method as claimed in claim 2, further comprising:

determining the level difference between the measured receive level of the downlink signal of the target cell and the optimum level of the uplink signal of the target cell, determining the transmitting power which the mobile station is to use in the target cell by subtracting said level difference from the maximum transmitting power level of the target cell, and commanding the mobile station to use said determined transmitting power as the initial power output level in the target cell, determining the transmitting power which the mobile station is to use in the target cell by subtracting said level difference from the maximum transmitting power level of the target cell, and commanding the mobile station to use said determined transmitting power as the initial power output level in the target cell following the handover.

4. The method as claimed in claim 1, 2 or 3, further comprising:

informing the mobile station and a respective base station prior to the handover of the transmitting power level which the mobile station is to use in the target cell.

5. The method as claimed in claim 1, 2 or 3, further comprising:

transmitting information as to the transmitting power level the mobile station is to use in the target cell to the mobile station in a handover command, and to a respective base station, as a new channel is allocated.

6. A power control arrangement for a handover in a mobile communication system, comprising:

each cell of a plurality of cells, including a target cell, being assigned a maximum transmitting power level at which mobile stations of said system are allowed to transmit in the respective cell, and an optimum level for the uplink signal which a respective mobile station is to achieve following the handover, and the transmitting power level of the mobile station following the handover being lower than the maximum transmitting power level of the target cell by an amount equal to the difference between the optimum level of the uplink signal of the target cell and the receive level of the downlink signal of the target cell as measured prior to the handover, if the measured receive level of the target cell is higher than the optimum level of the uplink signal of the target cell.

7. The arrangement as claimed in claim 6, further including:

a base station controller serving plurality of said cells. said base station controller being arranged to store therein information as to the maximum transmitting power levels of the cells and the optimum levels of the uplink signals, and that the base station controller is adapted to control handover situations and power control in the cells served by said base station controller.

* * * * *